United States Patent
Alothman et al.

(10) Patent No.: US 9,706,055 B1
(45) Date of Patent: Jul. 11, 2017

(54) AUDIO-BASED MULTIMEDIA MESSAGING PLATFORM

(71) Applicant: Bleepmic LLC, Palo Alto, CA (US)

(72) Inventors: Abdullah Alothman, Al Shamiya (KW); Khaled Aly, Khaldiya (KW)

(73) Assignee: Bleepmic LLC, Palo Alto, CA (US)

( * ) Notice: Subject to any disclaimer, the term of this patent is extended or adjusted under 35 U.S.C. 154(b) by 0 days.

(21) Appl. No.: 14/505,507

(22) Filed: Oct. 3, 2014

Related U.S. Application Data

(60) Provisional application No. 61/887,817, filed on Oct. 7, 2013.

(51) Int. Cl.
*H04M 11/00* (2006.01)
*H04M 3/56* (2006.01)
*H04M 3/53* (2006.01)

(52) U.S. Cl.
CPC .............. *H04M 3/567* (2013.01); *H04M 3/53* (2013.01)

(58) Field of Classification Search
CPC ................. H04M 3/53333; H04M 2203/4536
USPC ...................................................... 379/88.13
See application file for complete search history.

(56) References Cited

U.S. PATENT DOCUMENTS

| | | | | |
|---|---|---|---|---|
| 8,422,997 | B1 * | 4/2013 | Lundy ................. | H04M 1/7255 379/1.02 |
| 2008/0043943 | A1 * | 2/2008 | Sipher ................. | G06Q 10/107 379/88.22 |
| 2009/0061827 | A1 * | 3/2009 | Bulgin ................. | H04M 1/6505 455/413 |
| 2009/0252305 | A1 * | 10/2009 | Rohde ................... | H04M 1/247 379/88.13 |

OTHER PUBLICATIONS

AudioBoom: http//en.wikipedia.org/wiki/AudioBoom. Retrieved Jun. 9, 2015.
Bubbly (social network): http://en.wikipedia.org/wiki/Bubbly_(social_network). Retrieved Jun. 9, 2015.
Yappie About Us: https://yappie.com/about/faqs. Retrieved Jun. 9, 2015.
Bubbly—Share your Voice: http://bubbly.net/. Retrieved Jun. 9, 2015.
Coco About Us: http://icoco.com/about. Retrieved Feb. 25, 2015.
Cord—Frequently Asked Questions: http://cordproject.co/faq.html#whatis. Retrieved Jun. 9, 2015.
Cord—One Tap Chat: http://cordproject.co/. Retrieved Jun. 9, 2015.

\* cited by examiner

*Primary Examiner* — Van D Huynh
(74) *Attorney, Agent, or Firm* — Raubvogel Law Office

(57) ABSTRACT

A device, software and/or operating system implement independent point-to-point, point-to-multipoint and multipoint-to-point audio messaging platforms. Remote communication is enabled via audio messages in a public, semi-public, private group and/or private chat environment. The methodology allows for simulated conversations resembling those that would otherwise normally be possible in a live face-to-face meeting, group setting or town hall type event.

42 Claims, 5 Drawing Sheets

AUDIO-BASED MULTIMEDIA MESSAGING PLATFORM

CROSS-REFERENCE TO RELATED APPLICATION

The present application claims priority from U.S. Provisional Application Ser. No. 61/887,817 for "Audio-Based Multimedia Messaging Platform," filed Oct. 7, 2013, which is incorporated by reference herein in its entirety.

TECHNICAL FIELD

The present document relates to audio messaging platforms.

SUMMARY

Various embodiments described herein provide a device, software and/or operating system for implementing independent point-to-point, point-to-multipoint and multipoint-to-point audio messaging platforms.

In at least one embodiment, the system and method described herein enable remote communication via audio messages in a public, semi-public, private group, and/or private chat environment. The remote communication methodology described herein allows for simulated conversations resembling those that would otherwise normally be possible in a live face-to-face meeting, group setting or town hall type event.

In at least one embodiment, the described system allows people to have a town-hall like conversation in a moderated and organized fashion. All participants are given the opportunity to speak and to be heard by the entire group.

The described system thus provides improved functionality over conventional systems that, for example, provide a platform for exchanging and/or posting voice messages, but do not provide or simulate a natural conversational setting.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Reference herein to "messages" or "audio messages" are intended to refer to any suitable form of content or media items, including for example and without limitation: audio messages or content; voice messages or content; video messages or content; audiovisual messages or content; text-based messages or content; image-based messages or content; interactive messages or content; and/or the like. In addition, the techniques described herein can be used with any suitable combination of the above. In at least one embodiment, the techniques described herein are particularly suited to linear content such as audio messages or audiovisual messages.

In at least one embodiment, the described system uses an auto-play feature to allow participants to have audio-based conversations with the public, in private groups or in private chats. Users can share and discuss any subject matter, including for example pictures, videos and files using this audio-based messaging platform.

In at least one embodiment, the system is implemented in a device-independent and operating system independent manner, so that it can operate regardless of the operating system or the type of device being used.

Any suitable mechanism can be used for transmitting an audio message to a destination device such as a mobile device. The audio message may be sent via any suitable communication mechanism, such as for example the Internet, an MMS system over 2G, 3G or 4G cellular networks, instant messaging systems, Application Program Interface function calls, or any combination thereof. Thus, the system is able to provide audio-based messaging across any suitable platform and/or interface.

The system allows users to post audio messages, along with attached media, to their public listeners, a private group of friends, or individuals via a private chat channel.

System Architecture

According to various embodiments, the system can be implemented on any electronic device or devices equipped to receive, store, and present information. Such electronic devices may include, for example, a desktop computer, laptop computer, smartphone, tablet computer, or the like. In at least one embodiment, the system is implemented using two or more such devices, which communicate with one another via a communications network.

Although the system is described herein in connection with an implementation in a computer or mobile device, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 1:
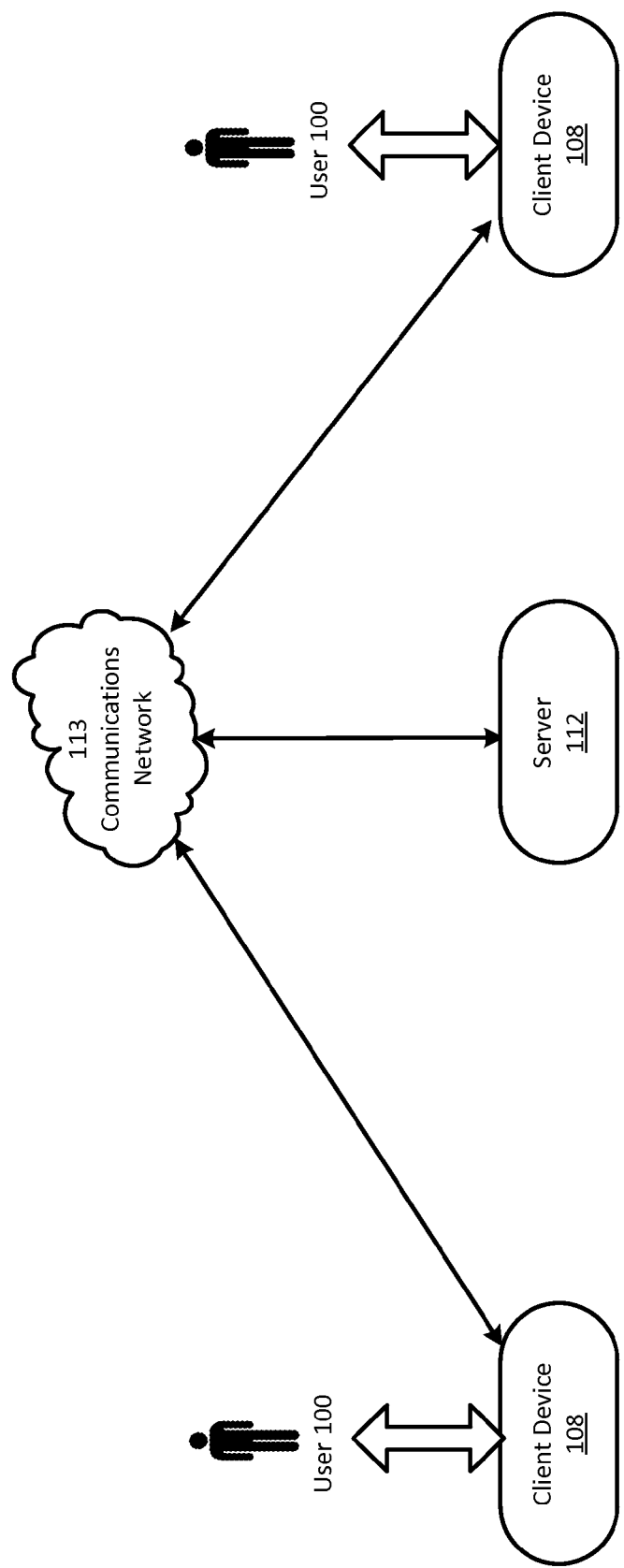
FIG. 1 is a block diagram depicting an overall hardware architecture according to one embodiment.

Referring now to FIG. 1, there is shown a block diagram depicting an overall hardware architecture for practicing the described system, according to one embodiment. Such an architecture can be used, for example, for implementing the techniques of the system including two or more computers, tablets, smartphones, and/or other devices; these devices are referred to as client devices 108. Client devices 108 may be operated by users 100. In at least one embodiment, the system also includes server 112, which performs certain processing, storing, routing, distribution, and communication functions as described herein. Any number of client device(s) 108 and/or server(s) 112 can be used to implement the techniques described herein. In at least one embodiment, the functions performed by client device(s) 108 and/or server(s) 112 can be performed by any other suitable devices, and indeed the system can be implemented without any server 112 if desired. In general, client device(s) 108 and server(s) 112 may be any electronic device(s) equipped to receive, store, transmit, receive, and/or present data such as audio messages, and to receive user input in connect with such data. Examples include a desktop computer, laptop computer, personal digital assistant (PDA), cellular telephone, smartphone, music player, handheld computer, tablet computer, kiosk, game system, or the like. Communication among client devices 108 and server 112 takes place over any suitable communications network 113, as described in more detail below.

Figure 2:
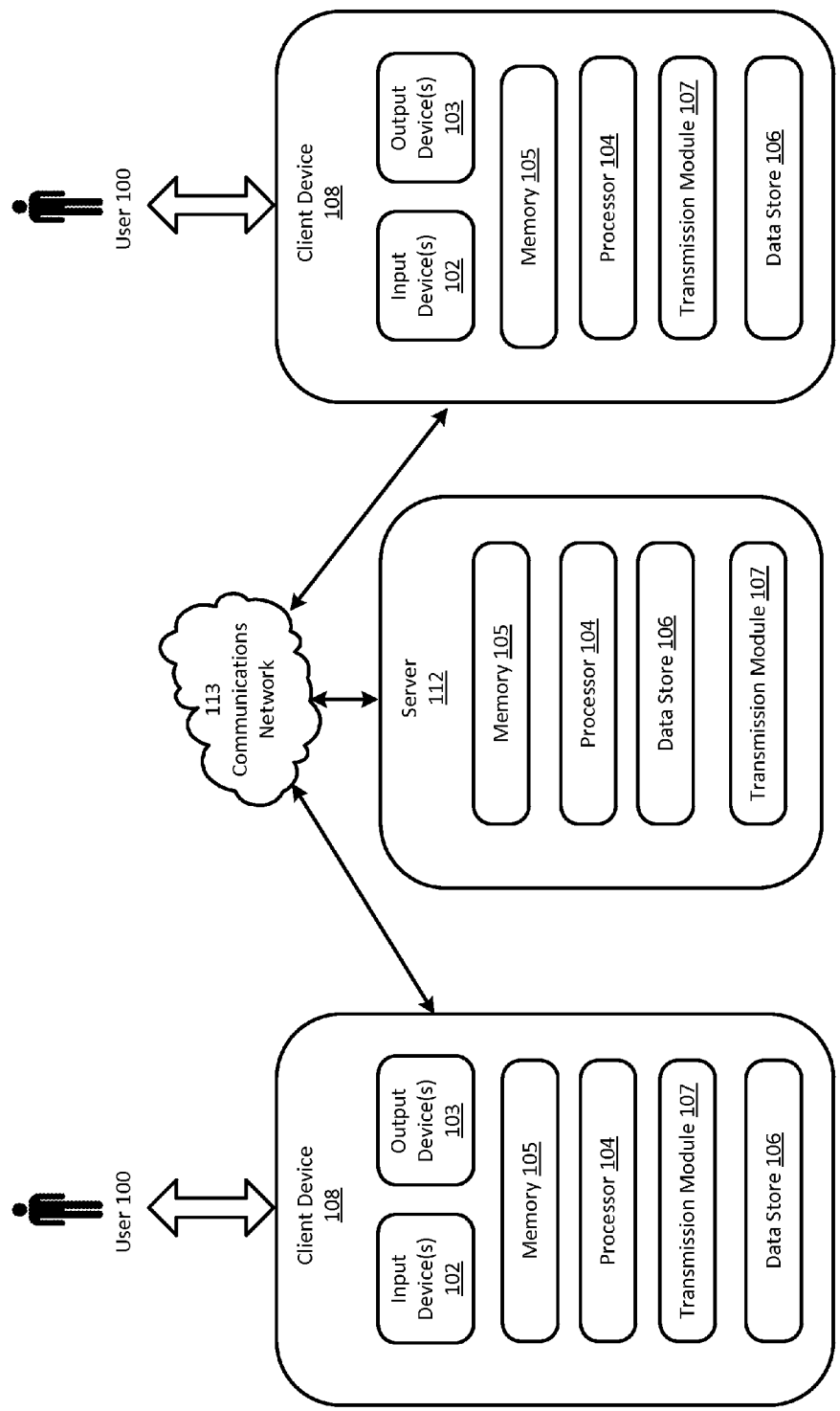
FIG. 2 is a block diagram depicting a more detailed hardware architecture according to one embodiment.

Referring now to FIG. 2, there is shown a block diagram depicting a more detailed hardware architecture according to one embodiment. In at least one embodiment, each client device 108 can include hardware components such as, for example, input device(s) 102, output device(s) 103, processor 104, transmission module 107, memory 105, and/or data store 106.

Input device(s) 102 can include any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. Such input can be interpreted as message content, and/or as commands for operating device 108 and/or the entire system.

Output device(s) 103 can include any type of visual, audio, and/or haptic output device. Examples include a display screen, speaker, earpiece, headphone, vibrating/haptic element, and/or any combination thereof. In at least one embodiment, output device 103 includes a speaker or audio output connector for presenting playback of audio messages as described herein. In at least one embodiment, output device 103 includes a display and a speaker or audio output connector, for presenting playback of audiovisual messages as described herein.

In at least one embodiment where only some of the desired output is presented at a time, a dynamic control, such as a scrolling mechanism, may be available via input device 102 to change which information is currently displayed, and/or to alter the manner in which the information is displayed.

Any suitable type of communications network 113, such as the Internet, can be used as the mechanism for transmitting data between client device(s) 108 and server 112, according to any suitable protocols and techniques. Communications network 113 can be wired and/or wireless. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 112 containing the requested data.

Data store 106 can be any magnetic, optical, or electronic storage device for data in digital form; examples include flash memory, magnetic hard drive, CD-ROM, DVD-ROM, or the like. Data store 106 can be local or remote with respect to the other components of device(s) 108 or server 112. In at least one embodiment, device 108 or server 112 is configured to retrieve data from a remote data storage device when needed. Such communication between device(s) 108, server 112, and other components can take place wirelessly, by Ethernet connection, via a computing network such as the Internet, or by any other appropriate means. This communication with other electronic devices is provided as an example and is not necessary.

In at least one embodiment, data store 106 is detachable in the form of a CD-ROM, DVD, flash drive, USB hard drive, or the like. In another embodiment, data store 106 is fixed within device(s) 108 or server 112.

Processor 104 can be a conventional microprocessor for performing operations on data under the direction of software, according to well-known techniques. Memory 105 can be random-access memory, having a structure and architecture as are known in the art, for use by processor 104 in the course of running software. Transmission module 107 can be any component configured to allow device(s) 108 and/or server 112 to transmit and/or receive communications via network 113.

In this implementation, server 112 is responsible for data storage and processing, and incorporates data store 106 for storing data to be used by the system. Server 112 may include additional components as needed for retrieving data from data store 106 in response to requests from client device(s) 108.

Operational Overview

In at least one embodiment, the system operates as follows. The user records a message (such as an audio message or voice message) and is given the opportunity to add a text comment, description, hyperlink, hashtag, title, picture, video, map, and/or the like. The user can then post the message to a public, group, or private conversation, either with or without the added item(s). Such messages can be posted as new items or in reply to other postings, items, or statements made publicly, in group conversations, or in private conversations. In alternative embodiments, the techniques described herein can be applied to other types of messages besides audio or voice messages, including for example any type of auditory or audiovisual content, or other messages.

In at least one embodiment, users can maintain lists of people they want to "follow" or listen to. If a user has indicated that he or she would like to listen to another individual, then every time the individual posts a public message, the message shows up on a page, referred to as the user's "bleepline", which displays a list of messages (such as audio messages) in order of occurrence posted by the people that user is listening to. Users can make their profile private so that anyone who wishes to listen to that user must send a listening request, subject to the user's approval. Users can also subscribe to a topic (tagged, for example, by a hashtag) and stay updated with any posts by any users related to that specific topic. In such a situation, the user is automatically notified when a message is posted that relates to the topic.

In at least one embodiment, users can search for other users by name, description or location. In at least one embodiment, users can message other users who display their location on a map, for example by selecting an icon that represents that user on a map of a specific or general search area.

In at least one embodiment, the system allows users to set up moderated conversations wherein a moderator or administrator invites some members to form a panel, and the general public can post questions directly to that panel. The moderator can pre-screen messages for possible playback to the panel, and can specify which members of the panel are to be given an opportunity to respond and in what order.

In at least one embodiment, the system allows users in a private group to make their conversation a live conversation.

A VOIP conference call is automatically initiated, and the users can speak and/or listen to one another in real time.

In at least one embodiment, users can set up a group, post messages to the group, and/or engage in a simulated group conversation.

In at least one embodiment, users can share hyperlinks or shortlinks to URLs of recorded voice messages and conversations via SMS, Email, IM, on websites, and/or by any other suitable means. Users can also share messages with other systems using those systems' APIs and/or by having those systems interface with the system's API.

Details of Operation

In at least one embodiment, the system is implemented using the PHP scripting language as well as MySQL databases for the web app. In at least one embodiment, the system is implemented for the iOS operating system using Objective C, or on the Android operating system in Java, or on Windows, Windows Mobile, Blackberry OS 10, Tizen, and/or any other mobile (or non-mobile) operating system. Any suitable programming language can be used for implementing the techniques described herein. such as for example C/C++/Qt, JavaScript/CCS/HTML, ActionScript/AIR, Java, Android C#, VB, native (C++) code, Jquery, Jquery Mobile for Tizen, and/or the like.

Each user is assigned a database tree, containing basic account and profile information. The database tree also stores a list of the people that the user is listening to (i.e., those people the user has subscribed to) and the people who are listening to them (i.e. those people who have subscribed to them). The database tree also stores private groups as well as the group members of those groups. In at least one embodiment, the database tree also stores private conversations, topics the user is listening to (specified, for example, as hashtags), and/or other relevant information.

Figure 3:
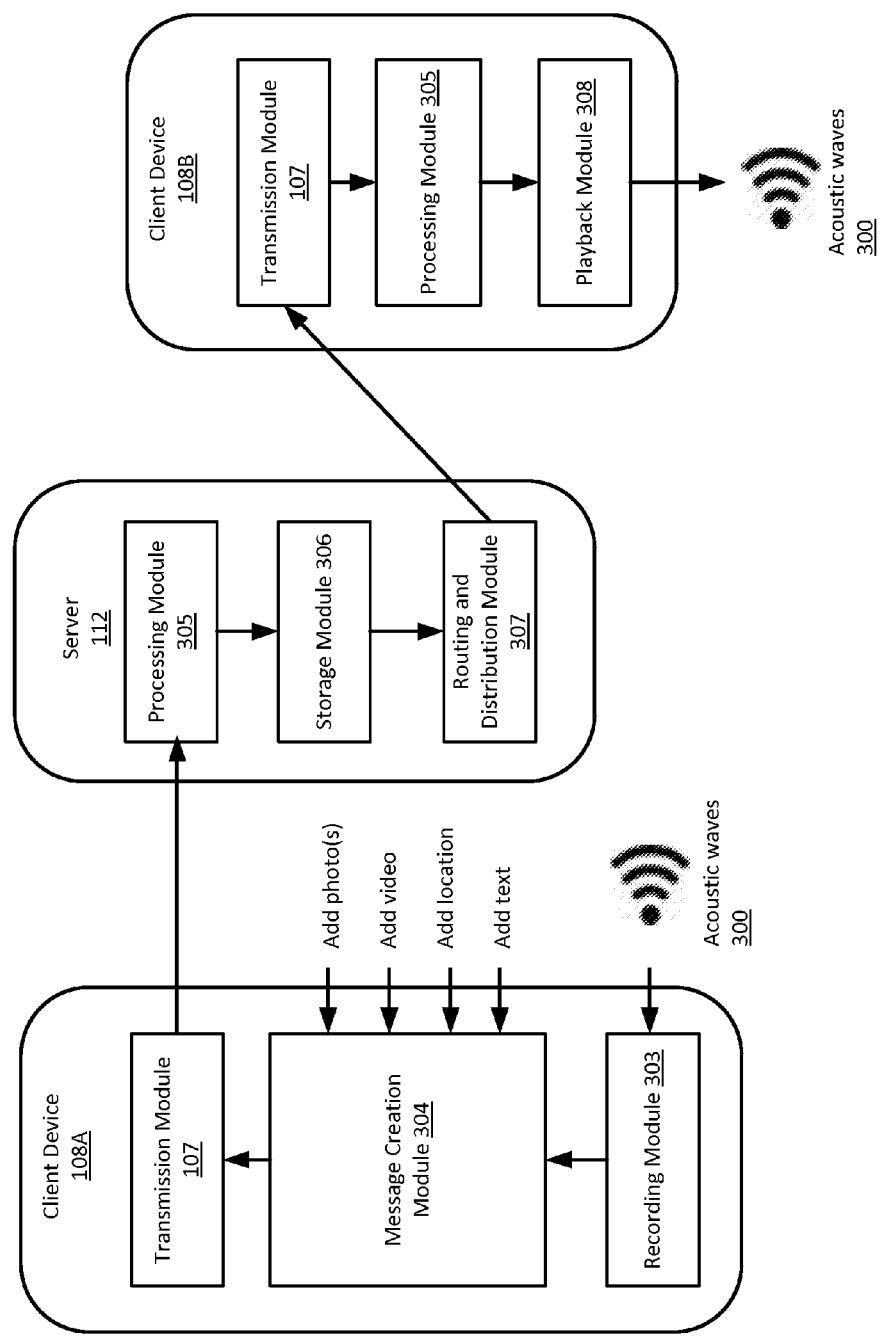
FIG. 3 is a block diagram depicting functional components of a message creation and re-creation system according to one embodiment.
Figure 4:
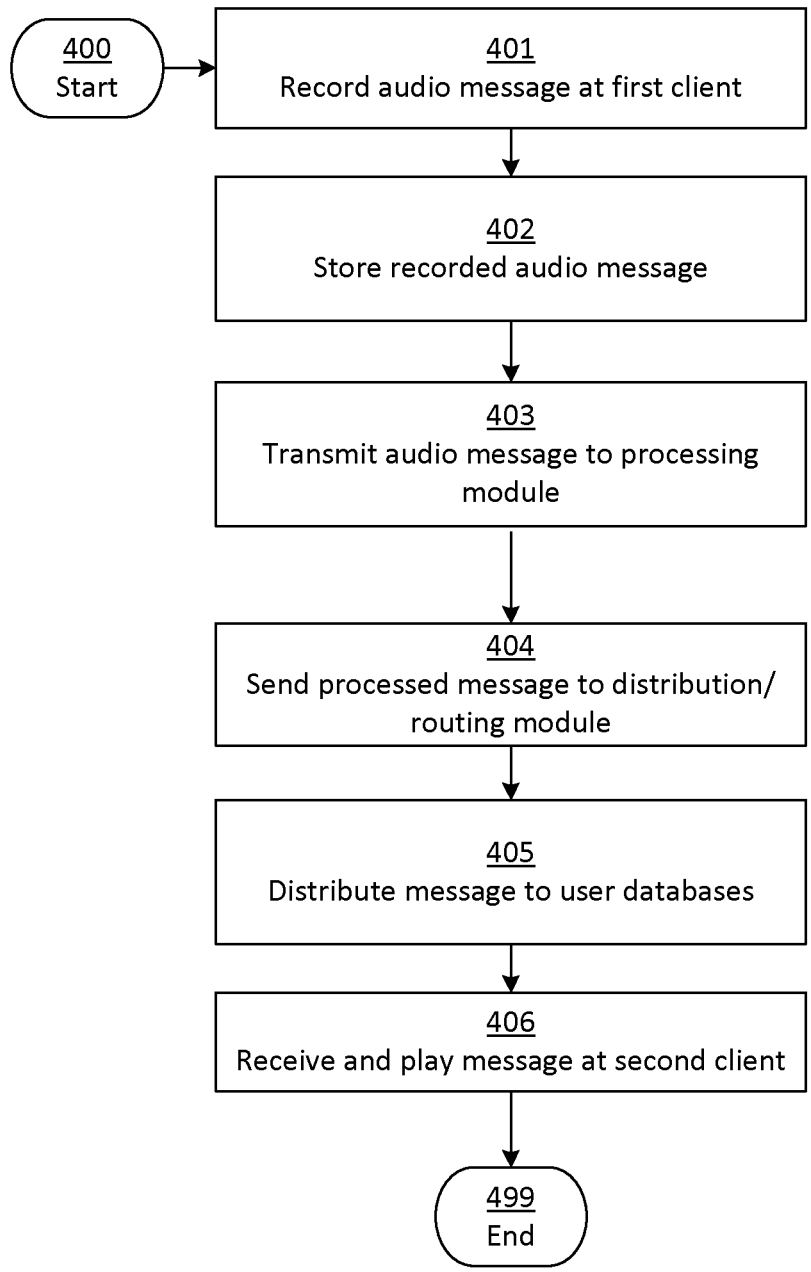
FIG. 4 is a flow diagram depicting a method of recording, transmitting, and playing audio messages according to one embodiment.

Referring now to FIG. 4, there is shown a flow diagram depicting a method of recording, transmitting, and playing audio messages according to one embodiment. The method can be performed using a system having the architecture shown in FIG. 1 and/or FIG. 2, although one skilled in the art will recognize that other architectures can be used. Referring now also to FIG. 3, there is shown a block diagram depicting functional components of a message creation and re-creation system according to one embodiment. The system of FIG. 3 can be implemented, for example, using the physical architecture depicted in FIG. 1 and/or FIG. 2.

An audio message is recorded 401 using a recording module 303 on client device 108A, which converts acoustic waves 300 into digital data using a client-side recording interface according to well-known techniques. In at least one embodiment, recording module 303 includes input device 102 (such as a microphone) of client device 108A, which records an audio message. If the message has a visual component, input device 102 can include a camera. Message creation module 304, which may be implemented on processor 104 of device 108A, converts the message to electronic form, and data store 106 stores 402 the recorded message. Any related attachments to the message, such as text comments (which can include to a word tag, a hyperlink or just simple text to describe the message), photo(s), video(s), map(s), or file(s), can be appended to the audio message; this can take place either during or after the recording of the audio.

The message is then transmitted 403, via transmission module 107, to processing module 305 on server 112, which may be implemented on processor 104 of server 112. Processing module 305 which reads the information related to the message such as the originator of the message, the related account information, the metadata, and the attached files (if any). It is in the processing module that information related to the message is fully recognized. Examples include location data, text tags (which can be converted into active searchable hash tags), and/or hyperlinks.

Processing module 305 then sends 404 the processed message with its related data to routing and distribution module 307, which distributes 405 the message to the user's own database and/or to the databases of the other users (for example on other device(s) 108B). For example, the message may be sent to those users who have subscribed to this user, or who have subscribed to a hashtag that has been mentioned, or are part of a group discussion with this user, or are part of a private conversation with this user; the message may also be sent based on any other pre-defined rules by either the user or by the system itself. Users can subscribe to messages based on any characteristic of the messages, including for example origin, author, subject or topic, keywords, and/or the like. Messages can be sent as a push operation (i.e., without the need for a specific request by the receiver to check for messages), or as a pull operation (i.e., in response to a request by the receiver to check for messages).

In step 406, the message is received by transmission module 107 of the receiving user's client-side device 108B, processed via processing module 305 of that device 108B, and output via playback module 308. In at least one embodiment, the receiving user can listen to the message through the conversion of the digital data into electrical signals, which are in turn converted into acoustic signals 300. Other information related to the message can be displayed on the client-side interface (for example, on a display device of the receiving user's client-side device 108B).

In at least one embodiment, visual representations of audio messages received at client device 108B are displayed on a client-side interface in a specified sequence, such as newest to oldest or oldest to newest. In at least one embodiment, the client-side interface creates a conversational effect when a user chooses to listen to a specific message, for example by tapping or selecting a visual representation of that message. Specifically, in coordination with the processing, distribution and transmission systems, the client-side interface system plays the selected message and also requests subsequent messages from the "CORE" system (which includes the processing, database, routing and distribution and transmission modules). The system stores these subsequent messages in temporary or permanent storage memory 105 of the client device 108B, and prepares them to be played in the appropriate chronological sequence (from newest to oldest or from oldest to newest). In at least one embodiment, in order to avoid delay in switching between one message and the subsequent message, the system combines a number of messages from the message chosen and onwards into one data stream for presentation to receiving user 100.

In at least one embodiment, receiving user 100 can respond to received messages; this back and forth interaction among users 100 of the system simulates an actual conversation and creates an impression of a group communication.

Since the system is designed to be device- and software-independent, the specific functionality shown and described herein is merely exemplary. The system can operate on a variety of interfaces, processing systems, transmission media, distribution systems and client-side interface manifestations.

Auto-Play

In at least one embodiment, the system implements an auto-play feature. In response to any suitable trigger event, such as a user 100 clicking or tapping on a "play" icon on device 108, or clicking or tapping on a visual representation of a received message on device 108, the system automatically plays, in sequence, the next messages that have not yet been listened to or the next messages in chronological order. Messages can be successively output in a continuous manner, so that the user need not initiate playback of each message separately. The messages can be audio messages, audiovisual messages, or any other type of messages or content items. The messages can be played in any suitable sequence, such as for example, most recent to least recent, least recent to most recent, or the like. By playing a sequence of messages in this manner, the system provides users with a simulated, moderated conversational feel. It allows users to feel that they are part of a real discussion and they can listen to the discussion as it evolves.

Figure 5:
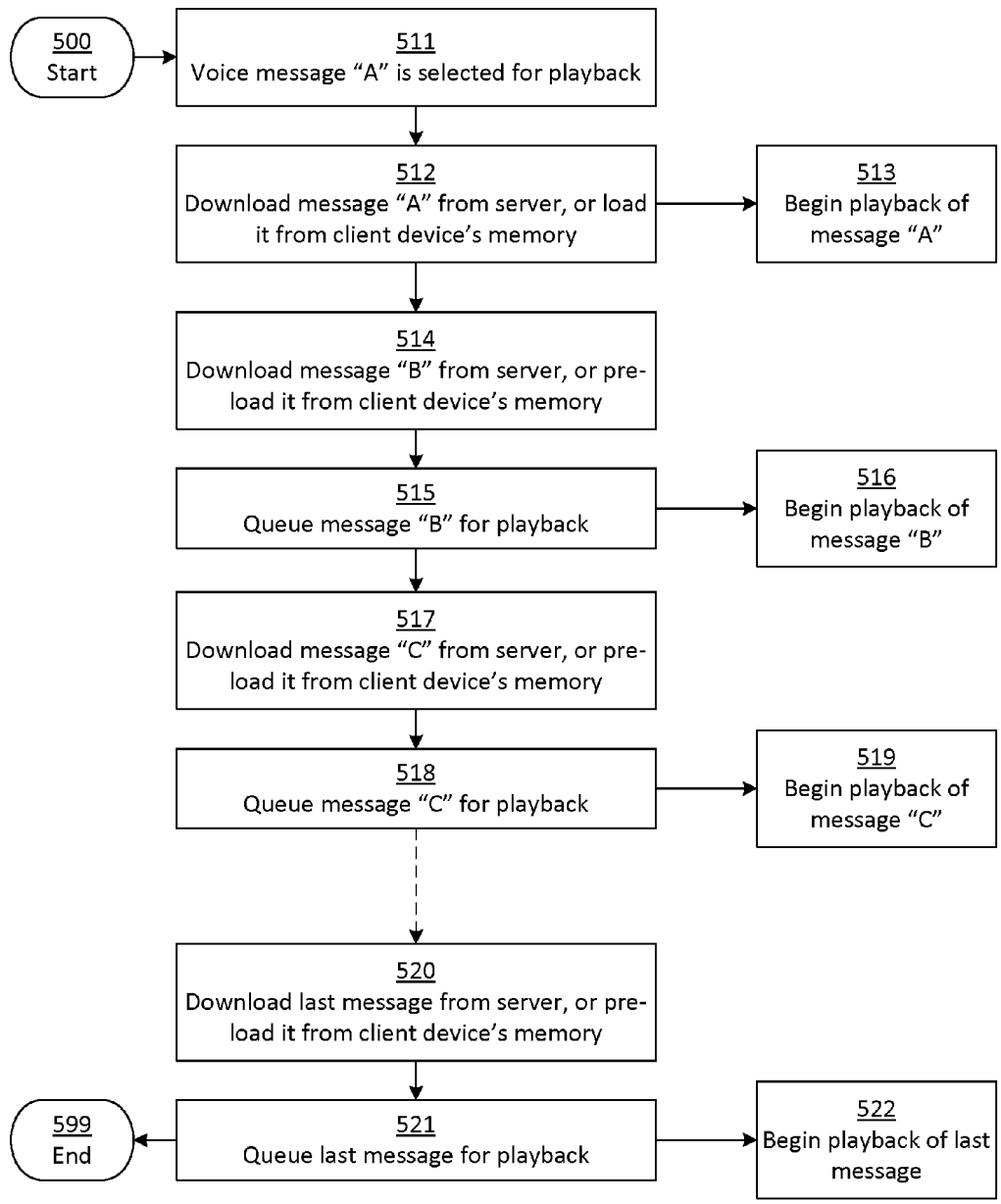
FIG. 5 is a flow diagram depicting auto-play functionality for continuous message playback according to one embodiment.

Referring now to FIG. 5, there is shown a flow diagram depicting auto-play functionality for continuous message playback according to one embodiment. In at least one embodiment, the steps depicted in FIG. 5 are performed at receiving client device 108B, and provide a mechanism for improved playback of received messages. The depicted method is particularly well suited for messages that are output in a linear format, such as audio messages or audiovisual messages, although it can be used for other types of messages as well.

The method begins 500. A voice message "A" is selected 511 for playback, for example by the user 100 clicking or tapping on a visual representation of a received message on device 108. Message "A" is downloaded 512 from server 112, or loaded from memory 105 or data store 106 of device 108. Playback of message "A" begins 513.

Message "B", which follows message "A" in the sequence of messages to be played, is automatically downloaded 514 from server 112, or pre-loaded from memory 105 or data store 106 of device 108. In at least one embodiment, step 514 can take place while playback 513 of message "A" is still taking place, so as to avoid or minimize any gap between playback of the messages. Message "B" is queued 515 for playback, and is played 516 once playback of message "A" is complete (or once user 100 indicates that he or she is not interested in hearing the rest of message "A", for example by tapping or clicking on a "skip" command or button). In at least one embodiment, steps 514 through 516 can take place without any specific input from the user indicating that the next message should be played.

Message "C", which follows message "B" in the sequence of messages to be played, is downloaded 517 from server 112, or pre-loaded from memory 105 or data store 106 of device 108. In at least one embodiment, step 517 can take place while playback 516 of message "B" is still taking place, so as to avoid or minimize any gap between playback of the messages. Message "C" is queued 518 for playback, and is played 519 once playback of message "B" is complete (or once user 100 indicates that he or she is not interested in hearing the rest of message "B", for example by tapping or clicking on a "skip" command or button). In at least one embodiment, steps 517 through 519 can take place without any specific input from the user indicating that the next message should be played.

The steps of downloading, queuing, and playing back messages are repeated for all the messages in the sequence, until the last message is downloaded, queued, and played in steps 520, 521, and 522, respectively. The method then ends 599. Although FIG. 5 depicts the steps for four messages, one skilled in the art will recognize that the described method can be applied and extended for any number of messages, including dozens, hundreds, or thousands of messages, or more.

The auto-play feature depicted in FIG. 5 allows a user 100 to listen to a full conversation around a topic, for example from oldest message to newest message, providing distinct advantages over other systems that require users to click on individual messages one at a time. Here, there is no need for the user to specify individual messages for playback.

In at least one embodiment, the auto-play feature functions across a variety of media types on a variety of platforms.

In at least one embodiment, a visual display indicates the current status of message playback. For example, as the messages are being played, the displayed items can be shifted up or down (or left or right) so that the currently playing item is shown at the center of the screen or at a predefined viewing area or location on the screen, such as for example the top of the screen for a mobile device, or the top one-third of the screen for a computer display each media item shifts up or down. Other messages (to be played or already played) can be shifted along with the currently playing message, based on chronological sorting.

If the user is listening to audio messages from a source such as a social news feed, and a video clip appears among the those audio messages, in at least one embodiment the system plays the video messages at the appropriate times within the sequence of media items. In at least one embodiment, while audio messages are being played, a picture denoting the source, or some other meaningful graphic, is displayed. In at least one embodiment, the display shifts as described above, so that each video item and/or graphic accompanying an audio file is displayed at the designated region on the screen when that video (or corresponding audio file) is being played.

In at least one embodiment, a similar approach is taken when playing messages via a message hub on the user's mobile device 108. Such a technique may have applicability, for example, when the user receives an audio message, video message, or picture with audio, via the system described herein.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for subscribing to messages, comprising:
at an input device, receiving input from a user, specifying at least one entity to follow in a social media context;
at a processor, identifying audio messages associated with the followed entity;
obtaining the identified audio messages; and
at an output device, successively and automatically playing at least two of the obtained audio messages in a single data stream.

2. The method of claim 1, wherein each audio message comprises an audiovisual message.

3. The method of claim 1, wherein:
receiving input from a user comprises is performed at a client device;

identifying audio messages associated with the followed entity is performed at a server; and
obtaining the identified audio messages comprises receiving the identified audio messages at the client from a server; and
successively and automatically playing the obtained audio messages is performed at the client device.

4. The method of claim 3, wherein receiving the identified audio messages at the client from a server comprises receiving the identified audio messages via wireless communication.

5. The method of claim 3, wherein receiving the identified audio messages at the client from a server comprises receiving the identified audio messages via a push operation.

6. The method of claim 3, wherein receiving the identified audio messages at the client from a server comprises receiving the identified audio messages via a pull operation.

7. The method of claim 1, further comprising:
receiving an audio message;
determining whether any users are following an entity associated with the audio message; and
responsive to a determination that at least one user is following the entity associated with the audio message, routing the audio message to the at least one user that is following the entity associated with the audio message.

8. The method of claim 7, wherein receiving an audio message comprises receiving an audio message posted to a social media forum.

9. The method of claim 1, wherein the followed entity comprises an individual, and wherein audio messages associated with the followed entity comprise audio messages posted by the individual.

10. The method of claim 1, wherein the followed entity comprises an individual, and wherein identifying audio messages associated with the followed entity comprises identifying audio messages posted in a social media forum by the individual.

11. The method of claim 1, wherein the followed entity comprises a tag, and wherein audio messages associated with the followed entity comprise audio messages containing the tag.

12. The method of claim 1, wherein the followed entity comprises a tag, and wherein identifying audio messages associated with the followed entity comprises identifying audio messages posted in a social media forum and containing the tag.

13. The method of claim 1, wherein the followed entity comprises a topic, and wherein audio messages associated with the followed entity comprise audio messages relating to the topic.

14. The method of claim 1, wherein the followed entity comprises a topic, and wherein identifying audio messages associated with the followed entity comprises identifying audio messages posted in a social media forum and relating to the topic.

15. The method of claim 1, wherein the followed entity comprises a conversation, and wherein audio messages associated with the followed entity comprise audio messages relating to the conversation.

16. The method of claim 1, wherein the followed entity comprises a conversation, and wherein identifying audio messages associated with the followed entity comprises identifying audio messages posted in a social media forum and relating to the conversation.

17. A system for transmitting messages, comprising:
at least one sender client device, each comprising:
a recording module, configured to receive input from a first user;
a message creation module, communicatively coupled to the recording module, configured to create at least one audio message based on the received input; and
a transmission module, communicatively coupled to the message creation module, configured to transmit the at least one created audio message over a communications network;
a server, comprising:
a processing module, configured to receive the at least one created audio message over the communications network;
a storage module, communicatively coupled to the processing module, configured to store the at least one created audio message;
a routing and distribution module, communicatively coupled to the storage module, configured to route the at least one created audio message to at least one receiver client device, based on subscription information received from a user of the at least one receiver client device to specify at least one entity to follow in a social media context; and
at least one receiver client device, each comprising:
a transmission module, configured to receive at least one audio message from the server;
a processing module, communicatively coupled to the transmission module, configured to process the received at least one audio message; and
a playback module, communicatively coupled to the processing module, configured to successively and automatically play at least two of the processed audio messages in a single data stream.

18. The system of claim 17, wherein each audio message comprises an audiovisual message.

19. The system of claim 17, wherein the followed entity comprises an individual, and wherein audio messages associated with the followed entity comprise audio messages posted by the individual.

20. The system of claim 17, wherein the followed entity comprises an individual, and wherein identifying audio messages associated with the followed entity comprises identifying audio messages posted in a social media forum by the individual.

21. The system of claim 17, wherein the followed entity comprises a tag, and wherein audio messages associated with the followed entity comprise audio messages containing the tag.

22. The system of claim 17, wherein the followed entity comprises a tag, and wherein identifying audio messages associated with the followed entity comprises identifying audio messages posted in a social media forum and containing the tag.

23. The system of claim 17, wherein the followed entity comprises a topic, and wherein audio messages associated with the followed entity comprise audio messages relating to the topic.

24. The system of claim 17, wherein the followed entity comprises a topic, and wherein identifying audio messages associated with the followed entity comprises identifying audio messages posted in a social media forum and relating to the topic.

25. The system of claim 17, wherein the followed entity comprises a conversation, and wherein audio messages associated with the followed entity comprise audio messages relating to the conversation.

26. The system of claim 17, wherein the followed entity comprises a conversation, and wherein identifying audio messages associated with the followed entity comprises identifying audio messages posted in a social media forum and relating to the conversation.

27. A computer program product for subscribing to messages, comprising:
a non-transitory computer-readable storage medium; and
computer program code, encoded on the medium, configured to cause at least one processor to perform the steps of:
causing an input device to receive input from a user, specifying at least one entity to follow in a social media context;
identifying audio messages associated with the followed entity;
obtaining the identified audio messages; and
causing an output device to successively and automatically play at least two of the obtained audio messages in a single data stream.

28. The computer program product of claim 27, wherein each audio message comprises an audiovisual message.

29. The computer program product of claim 27, wherein:
the computer program code configured to cause an input device to receive input from a user comprises computer program code configured to cause an input device at a client device to receive input from a user;
the computer program code configured to cause at least one processor to identify audio messages associated with the followed entity comprises computer program code configured to cause at least one processor to identify audio messages at a server; and
the computer program code configured to cause at least one processor to obtain the identified audio messages comprises computer program code configured to cause at least one processor to receive the identified audio messages at the client from a server; and
the computer program code configured to cause an output device to successively and automatically play the obtained audio messages comprises computer program code configured to cause an output device to successively and automatically play the obtained audio messages at the client device.

30. The computer program product of claim 29, wherein the computer program code configured to cause at least one processor to receive the identified audio messages at the client from a server comprises computer program code configured to cause at least one processor to receive the identified audio messages via wireless communication.

31. The computer program product of claim 29, wherein the computer program code configured to cause at least one processor to receive the identified audio messages at the client from a server comprises computer program code configured to cause at least one processor to receive the identified audio messages via a push operation.

32. The computer program product of claim 29, wherein the computer program code configured to cause at least one processor receive the identified audio messages at the client from a server comprises computer program code configured to cause at least one processor to receive the identified audio messages via a pull operation.

33. The computer program product of claim 27, further comprising computer program code configured to cause at least one processor to perform the steps of:
determining whether any users are following an entity associated with the message; and
identifying at least one characteristic of the message; and
routing the message to at least one subscriber based on the identified at least one characteristic of the message.

34. The computer program product of claim 33, wherein the computer program code configured to cause at least one processor to receive an audio message comprises computer program code configured to cause at least one processor to receive an audio message posted to a social media forum.

35. The computer program product of claim 27, wherein the followed entity comprises an individual, and wherein audio messages associated with the followed entity comprise audio messages posted by the individual.

36. The computer program product of claim 27, wherein the followed entity comprises an individual, and wherein identifying audio messages associated with the followed entity comprises identifying audio messages posted in a social media forum by the individual.

37. The computer program product of claim 27, wherein the followed entity comprises a tag, and wherein audio messages associated with the followed entity comprise audio messages containing the tag.

38. The computer program product of claim 27, wherein the followed entity comprises a tag, and wherein identifying audio messages associated with the followed entity comprises identifying audio messages posted in a social media forum and containing the tag.

39. The computer program product of claim 27, wherein the followed entity comprises a topic, and wherein audio messages associated with the followed entity comprise audio messages relating to the topic.

40. The computer program product of claim 27, wherein the followed entity comprises a topic, and wherein identifying audio messages associated with the followed entity comprises identifying audio messages posted in a social media forum and relating to the topic.

41. The computer program product of claim 27, wherein the followed entity comprises a conversation, and wherein audio messages associated with the followed entity comprise audio messages relating to the conversation.

42. The computer program product of claim 27, wherein the followed entity comprises a conversation, and wherein identifying audio messages associated with the followed entity comprises identifying audio messages posted in a social media forum and relating to the conversation.

* * * * *